(12) United States Patent
Matsuo et al.

(10) Patent No.: US 8,396,599 B2
(45) Date of Patent: Mar. 12, 2013

(54) ROBOT CONTROL APPARATUS AND ROBOT SYSTEM

(75) Inventors: Kenji Matsuo, Kitayushu (JP); Saburo Ono, Toyota (JP)

(73) Assignees: Kabushiki Kaisha Yaskawa Denki, Kitayushu-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 648 days.

(21) Appl. No.: 11/718,441

(22) PCT Filed: Nov. 2, 2005

(86) PCT No.: PCT/JP2005/020213
§ 371 (c)(1),
(2), (4) Date: May 2, 2007

(87) PCT Pub. No.: WO2006/049210
PCT Pub. Date: May 11, 2006

(65) Prior Publication Data
US 2008/0009973 A1    Jan. 10, 2008

(30) Foreign Application Priority Data
Nov. 2, 2004 (JP) .................................. 2004-319169

(51) Int. Cl.
G05B 19/00 (2006.01)

(52) U.S. Cl. .................. 700/264; 700/245; 700/248

(58) Field of Classification Search .................. 700/246, 700/245, 90, 248, 264; 715/772, 966, 967
See application file for complete search history.

(56) References Cited

U.S. PATENT DOCUMENTS

| | | | |
|---|---|---|---|
| 4,896,269 A | 1/1990 | Tong | |
| 5,260,868 A | 11/1993 | Gupta et al. | |
| 5,675,229 A * | 10/1997 | Thorne | 318/568.11 |

(Continued)

FOREIGN PATENT DOCUMENTS

| | | |
|---|---|---|
| EP | 0412228 A1 | 2/1991 |
| JP | 4-201081 A | 7/1992 |

(Continued)

OTHER PUBLICATIONS

Japanese Office Action dated Feb. 9, 2010 in Japanese Application No. 2004-319169.

(Continued)

Primary Examiner — Khoi Tran
Assistant Examiner — Stephen Holwerda
(74) Attorney, Agent, or Firm — Sughrue Mion, PLLC

(57) ABSTRACT

It is an object of the invention to provide a robot system including a graphics language capable of comprehensively and easily controlling operation of each robot in a robot system constituted by a plurality of pieces of robots.

A robot system of the invention in order to achieve the above-described object is constituted by a plurality of pieces of robots, a robot control apparatus 10 for controlling based on a robot program, and a robot instruction apparatus 11 connected to the robot control apparatus 10 for displaying the robot program, the robot control apparatus 10 includes a unit registration portion 1 for arbitrarily combining one piece or more of robots to define one unit, a task registration portion 2 for allocating a task to each unit, and a graphics language processing portion 3 capable of forming the robot program for each task as a graphic program in the robot system for simultaneously controlling one piece or more of robots.

6 Claims, 7 Drawing Sheets

U.S. PATENT DOCUMENTS

| | | | |
|---|---|---|---|
| 5,825,981 A * | 10/1998 | Matsuda | 700/248 |
| 6,061,602 A * | 5/2000 | Meyer | 700/83 |
| 6,167,328 A * | 12/2000 | Takaoka et al. | 700/264 |
| 6,266,577 B1 * | 7/2001 | Popp et al. | 700/248 |
| 6,374,156 B1 * | 4/2002 | Shimogama et al. | 700/245 |
| 6,408,226 B1 * | 6/2002 | Byrne et al. | 700/258 |
| 2001/0035729 A1 * | 11/2001 | Graiger et al. | 318/587 |
| 2002/0073094 A1 * | 6/2002 | Becker et al. | 707/102 |
| 2003/0090522 A1 * | 5/2003 | Verhaar | 345/772 |
| 2004/0030450 A1 * | 2/2004 | Solomon | 700/245 |
| 2004/0205702 A1 * | 10/2004 | Logan et al. | 717/109 |

FOREIGN PATENT DOCUMENTS

| | | |
|---|---|---|
| JP | 6-67709 A | 3/1994 |
| JP | 08-249026 A | 9/1996 |
| JP | 10-040090 A | 2/1998 |
| JP | 11-48178 A | 2/1999 |
| JP | 11-194810 A | 7/1999 |
| JP | 2001-150372 A | 6/2001 |
| JP | 2002-132318 A | 5/2002 |

OTHER PUBLICATIONS

Tianyang Dong et. al.: "Approach to Cooperative Assembly Task Planning for Multiple Manipulators" Proceedings. The 8th International Conference on Computer Supported Cooperative Work in Design, May 26-28, 2004; vol. 1, May 26, 2004, pp. 202-208.

Natsuki Miyata et. al.: "Cooperative Transport by Multiple Mobile Robots in Unknown Static Environments Associated With Real-Time Task Assignment" IEEE Transactions on Robotics and Automation. vol. 18. No. 5. October 1, 2002 pp. 769-780.

Jean-Jacques Borrelly et. al.: "The ORCCAD Architecture", The International Journal of Robotics Research, vol. 17, No. 4, Apr. 1, 1998, pp. 338-359.

Extended European search report dated Oct. 6, 2010 issued in counterpart Application No. EP 05805507.0.

* cited by examiner

FIG. 2

| UNIT | ROBOT |
|------|-------|
| U1 | R1 |
| U2 | R2 |
| U3 | R1+R2 |
| ⋮ | ⋮ |
| U99 | R1+R4 |

FIG. 3

| TASK | UNIT |
|------|------|
| T0 | NONE |
| T1 | U1 |
| T2 | U2 |
|  | U3 |
| ⋮ | ⋮ |
| T8 | U7 |

FIG. 6

NOP

INITIAL ST000

IF IN#10=ON

JUMP ST001

IF IN#11=ON

JUMP ST002

IF IN#12=ON

JUMP ST003

⋮

⋮

⋮

END

Prior Art
FIG. 7

FIRST SEQUENCE PROGRAM

| STEP | R2 ITEM ||||| R1 ITEM ||||| R3 ITEM ||||
|---|---|---|---|---|---|---|---|---|---|---|---|---|---|
| | F | OPERATION | PART | TOOL | LOCATION | F | OPERATION | PART | TOOL | LOCATION | F | OPERATION | PART | TOOL | LOCATION |
| 1 | | | | | | | MOV | | H1 | T | | SUP | P1 | | S |
| 2 | | MOV | | | E2 | | | | | | → | | | | |
| 3 | | | | | | | MOV | P1 | H1 | Su | | | | | |
| 4 | | MOV | | SD | T | | PCK | P1 | H1 | S | | | | | |
| 5 | → | | | | | | PCL | P1 | H1 | A | | | | | |
| 6 | | | | | | | MOV | P1 | H1 | Tu | | RST | P1 | | R |
| 7 | | DRV | P1 | SD | A | | CHG | H2 | H2 | T | | SUP | P2 | | S |
| 8 | → | | | | | | MOV | P2 | H2 | Su | | | | | |
| 9 | | CHG | | H3 | T | | PCK | P2 | H2 | S | | | | | |

Prior Art
*FIG. 8*
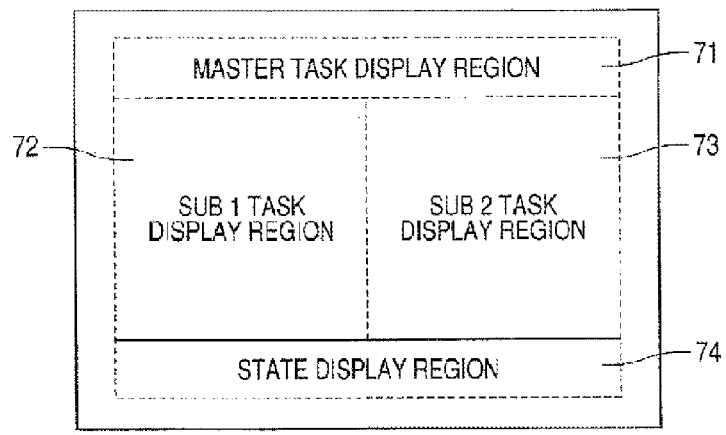
Prior Art *FIG. 9*
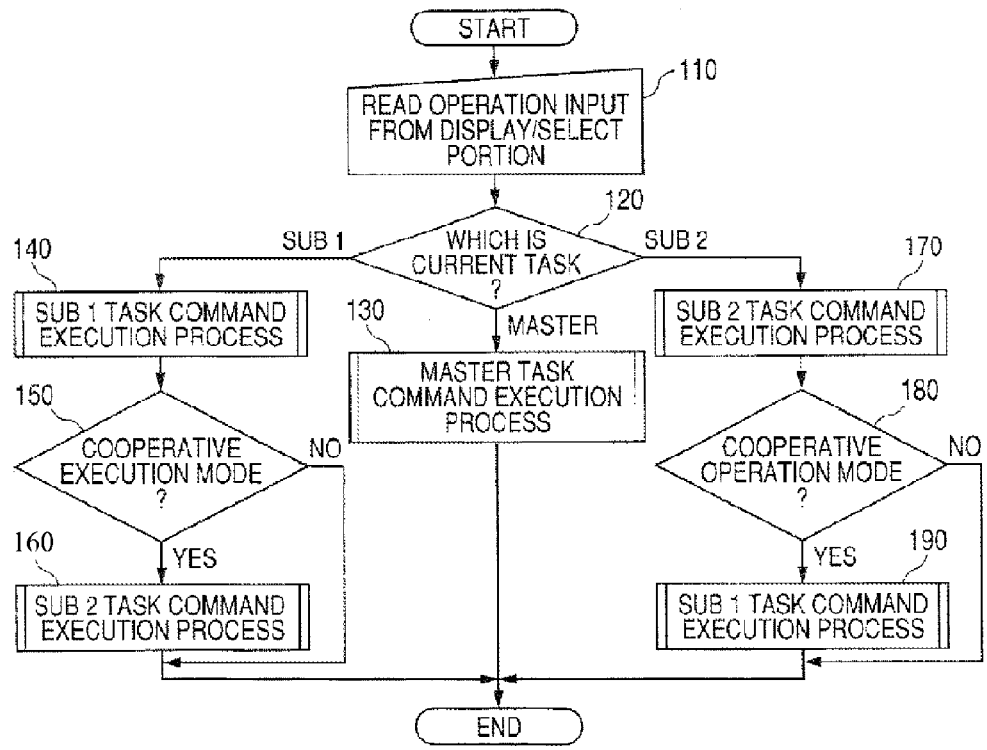

ROBOT CONTROL APPARATUS AND ROBOT SYSTEM

TECHNICAL FIELD

The present invention relates to a robot control apparatus and a robot system thereof for controlling a plurality of robots.

BACKGROUND ART

As a program of a background art of a robot control apparatus for controlling a plurality of robots, there is a sequence program shown in FIG. 7. In a first sequence program shown in FIG. 7, a vertical column thereof is described with steps from step 1 through steps 2, 3 ..., a horizontal column thereof is described with R1 item, R2 item and R3 item for respectively controlling robots RB1, RB2, and RB3. The same rows are the same steps and processed in parallel. A processing at each step is started after finishing to process one step before the each step.

Each R item comprises F column, operation column, part column, tool column, location column. F column displays presence/absence of a process continued from a preceding step, and when F column is described with an arrow mark, as in, for example, F column of step 2 of R3 item, it shows that a process of step 1 one step before thereof is continued to process also at step 2 (refer to Patent Reference 1).

Further, an explanation will be given of an apparatus of a background art for displaying a plurality of robot operation programs in reference to FIG. 8 through FIG. 10. In FIG. 8, a display region of a display screen of an operation program/state display portion is divided into a master task display region 71, a sub 1 task display region 72, a sub 2 task display region 73, a state display region 74, and a plurality of operation programs operated synchronizingly in accordance with a flowchart of FIG. 9 are displayed while cooperatively operating the operation programs as shown by FIG. 10. FIG. 10 shows the flowchart of FIG. 9 on a left side, shows a state display screen by respective operation programs of robots of FIG. 8 on a right side, and shows a behavior of controlling the display of FIG. 8 by the flowchart of FIG. 9 (refer to Patent Reference 2).

In FIG. 9 step 110 is a read operation where an input from the display/select is provided. At step 120 a determination is made as to which is the current task. If the current task is a master task, at step 130 a master task command execution process is executed. If the current task is a sub 1 task, at step 140 a sub 1 task command execution process is executed. Likewise, in the current task is a sub 2 task, at step 170 a sub 2 task command execution process is executed. In steps and 180, a determination is made if the tasks are in a cooperative execution mode. If the answer is positive then in steps 180 and 190, sub t task and sub 1 task command execution process is executed, respectively.

Patent Reference 1: JP-A-6-67709 (page 3, right row, line 46 through page 4, left row, line 17, FIG. 2)

Patent Reference 2: JP-A-11-48178 (page 3, right row, line 33 through page 4, left row, line 3, FIG. 2, FIG. 3, FIG. 6)

DISCLOSURE OF THE INVENTION

Problems That the Invention is to Solve

The invention described in Patent Reference 1 is effective in that when parallel processings are executed for respective robots, programs can be formed for the respective robots. However, an operator cannot comprehensively determine whether processings are executed in parallel by a certain operation unit, or processings are carried out synchronizingly.

For example, in an operation of executing welding for a work, the operation is constituted by a plurality of operation steps of a step of setting a work to a jig, a step of executing welding, a step of reversing the work, a step of executing welding, a step of carrying the work to a next step and the like.

The invention described in Patent Reference 1 poses a problem that the operator can determine by only viewing programs with regard to that in relation to the operation steps, which operation step is being executed currently, or under what condition, the execution transits from the operation step to a next step or the like.

On the other hand, according to the invention described in Patent Reference 2, the operation program of the robot is displayed on the display screen as it is to pose a problem that meaning of a display content is difficult to understand other than a skilled operator.

The invention is for resolving the problems provided to the background arts, and it is an object thereof to provide a robot system capable of simply determining which operation step is executed currently in relation to operation steps, or under what condition execution transits from the operation step to a next step, further, capable of understanding meaning of a display content even by other than a skilled person.

Means for Solving the Problems

In order to achieve the above-described object, according to claim 1, there is provided a robot control apparatus for controlling one piece or more of a plurality of pieces of robots simultaneously based on a robot program, including:

a unit registration portion for arbitrarily combining one piece or more of the plurality of sets of robots to define as a unit, a task registration portion for allocating a task for each of the unit, and a graphics language processing portion for forming the robot program as a graphical program for each of the task.

According to claim 2, there is provided the robot control apparatus according to claim 1, wherein the graphics language processing portion displays a sequence number time-sequentially executed at each row of display member of an instruction apparatus, and displays the robot program executed at the task to each column.

According to claim 3, there is provided the robot control apparatus according to claim 2, wherein the graphics language processing portion makes execution transit to a next step after finishing to execute a current step.

According to claim 4, there is provided the robot control apparatus according to claim 2 or 3, wherein the graphics language processing portion makes the execution transmit to a predetermined step based on an external input signal to the robot control apparatus after finishing to execute the current step.

According to claim 5, there is provided a robot system including:

a plurality of pieces of robots, a robot control apparatus according to any one of claims 1 to 4 for simultaneously controlling one piece or more of the plurality of pieces of robots based on a robot program, and a robot instruction apparatus connected to the robot control apparatus and including a display member and an edit member of the robot program.

EFFECTS OF THE INVENTION

By the above-described constitution, the robot system of the invention achieves a significant effect of capable of easily forming an operation sequence of a plurality of robots without being accustomed to a special language, further, in executing operation of the robot, by graphically displaying the execution state, an operator can comprehensively determine a current operational situation.

BRIEF DESCRIPTION OF THE DRAWINGS

FIG. 2 is a diagram showing an example of a unit registration screen shown in FIG. 1.

FIG. 3 is a diagram showing an example of a task registration screen shown in FIG. 1.

FIG. 6 is a diagram showing a robot program in correspondence with the example of the graphic program shown in FIG. 5.

FIG. 7 is a diagram showing a sequence program of a background art.

FIG. 8 is a diagram of dividing a region of a display screen of a background art.

FIG. 9 is a flowchart for explaining a process of the background art.

DESCRIPTION OF REFERENCE NUMERALS AND SIGNS

Figure 1:
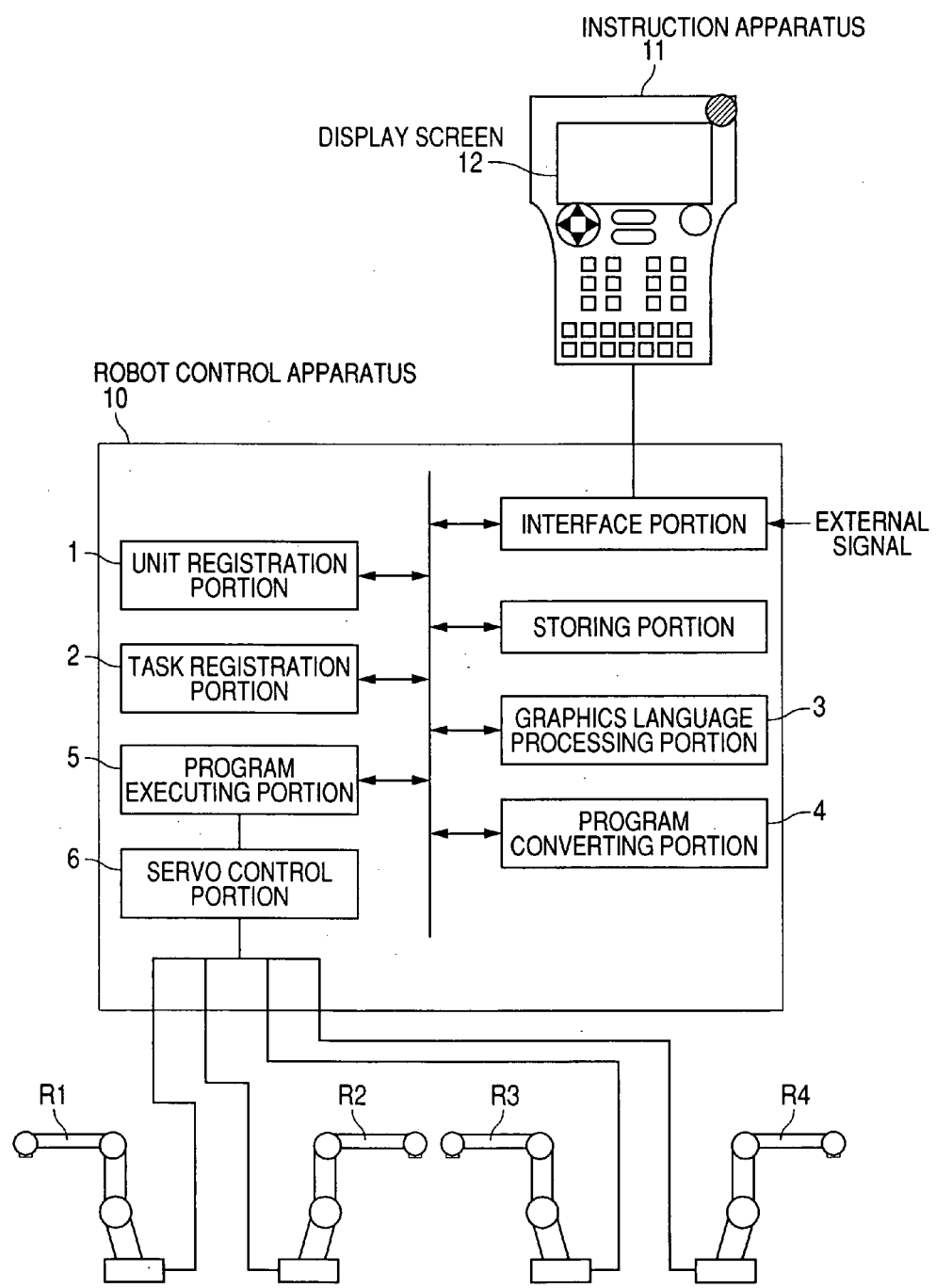
FIG. 1 is a robot system constitution diagram of the invention.

R1, R2, R3, R4 . . . robots
1 . . . unit registration portion
2 . . . task registration portion
3 . . . graphics language processing portion
4 . . . program converting portion
5 . . . program executing portion
6 . . . servo control portion
10 . . . robot control apparatus
11 . . . instruction apparatus
40 . . . program region
41 . . . software button signifying step
42 . . . software button signifying transition
43 . . . software button signifying conditioned jump
44 . . . software button signifying nonconditional jump
71 . . . master task display region
72 . . . sub 1 task display region
73 . . . sub 2 task display region
74 . . . control state display region

BEST MODE FOR CARRYING OUT THE INVENTION

An embodiment of the invention will be explained in reference to FIG. 1 through FIG. 6 as follows.

Embodiment 1

FIG. 1 is a constitution diagram of a robot system of the invention.

In FIG. 1, notations R1, R2, R3, R4 designate robots including electric servomotors at articulated portions. Here, the robot also includes one generally referred to as a positioner. That is, the robot indicates one including an articulated portion drive portion. In the following embodiment, an explanation will be given by assuming a case of using 6 axes articulated robot.

A robot control apparatus 10 controls the robots R1, R2, R3, R4. Although according to the embodiment, an explanation will be given of an example of 4 pieces thereof, 2 pieces or more will do. Further, although with regard also to the robot control apparatus, an explanation will be given of an example of 1 piece thereof according to the embodiment, there may be constructed a constitution of controlling respective robots by a plurality of robot control apparatus.

The robot control apparatus 10 is connected with an instruction apparatus 11. The instruction apparatus 11 includes various keys, a display screen 12. The display screen 12 is displayed with a graphical software button, mentioned later, based on a key operation of an operator. The software button displays an item which can currently be selected by the operator, a screen or a message in correspondence with the button is newly displayed by selecting the button by the operator.

The operator can operate a desired robot of the robots R1 through R4 and register a position thereof by operating keys of the instruction apparatus 11. Further, motion and operation of the robot can be programmed by selecting or inputting an instruction displayed on the display screen 12.

The robot program formed by operating the instruction apparatus 11 is stored to a storing portion at inside of the robot control apparatus 10. The robot program is started to execute by the instruction apparatus 11 or other external signal. The robot program is executed by a program executing portion 5 at inside of the robot control apparatus 10, and outputs an instruction for servomotors of respective articulated portions of the robots to a servo control portion 6. The respective robots are controlled based on the robot program in the above-described procedure.

A unit registration portion 1 registers a combination of a plurality of the robots as a unit.

Registration is carried out by displaying a table shown in FIG. 2 to the display screen 12 by operating the keys of the instruction apparatus 11 and then further operating the keys of the instruction apparatus 11 by the operator.

In an example of FIG. 2, unit 1 (U1) is registered with the robot R1, a unit 2 (U2) is registered with the robot R2, a unit 3 (U3) is registered with the robot R1 and the robot R2, respectively. Although in FIG. 2, a registration number of units is made to be up to 99, the registration number may be made variable in accordance with a number of pieces of the robots connected to the robot control apparatus 10 or operation content.

Successively, a task registration portion 2 will be explained in reference to FIG. 3.

The task registration portion 2 registers a relationship between the unit registered by the unit registration portion 1 and a task. The tasks are operation units executed independently from each other at inside of the robot control apparatus 10.

In an example of FIG. 3, there are the tasks from T0 to T8, and units of executing operations can be set to the respective tasks. The operator executes the settings by operating the keys of the instruction apparatus 11. A plurality of the units (U2+U3) can also be allocated to the single task as in the task T2. However, the task T0 is a special task for governing other tasks, and therefore, the units are not allocated thereto.

Next, a graphics language processing portion 3 will be explained.

Figure 4:
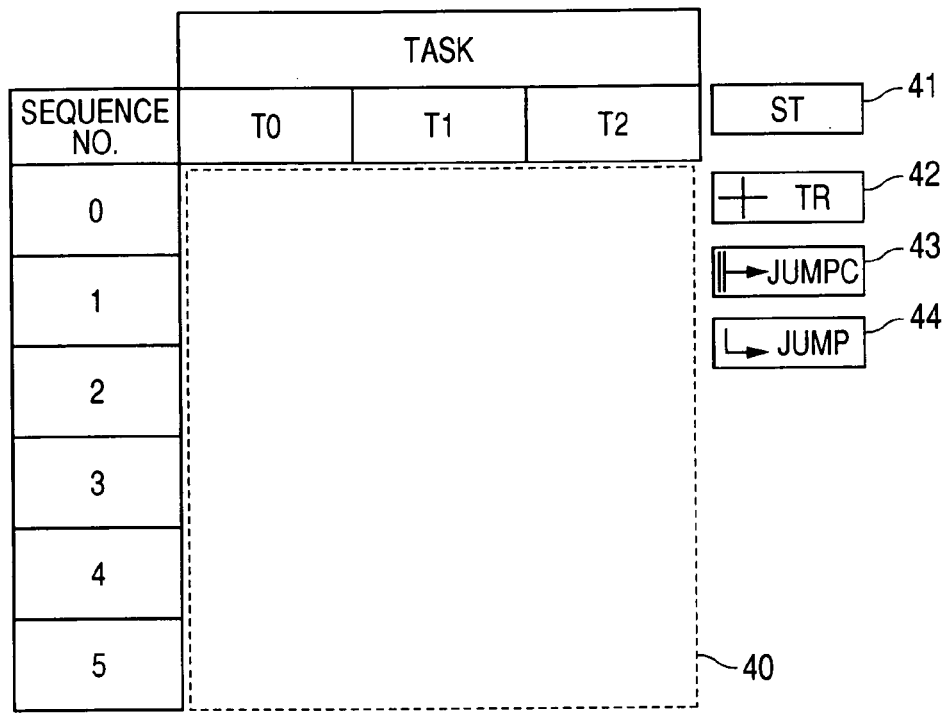
FIG. 4 is a diagram showing an example of a screen of forming a graphics program shown in FIG. 1.

The graphics language processing portion 3 displays a screen shown in FIG. 4 on the display screen 12 by operating the keys of the instruction apparatus 11.

In FIG. 4, notations T0, T1, T2 aligned in a row direction designate the above-described tasks, 0 through 5 aligned in a column direction designate sequence numbers. The sequence number is a number allocated for each instruction of a minimum unit constituting the robot program.

The operator can form a graphical program by arranging a software button or a condition at a program region 40 by operating the keys of the instruction apparatus 11 and software buttons 41 through 44 on the display screen 12.

Here, the software buttons 41 through 44 will be explained.

The software button 41 signifies a step. The step summarizes a series of operation executed by a unit and is identified by combination of 'ST' and a numeral. The operator successively inputs the numeral allocated to the step by operating the keys of the instruction apparatus 11 in selecting the software button 41. Further, step 0 (ST000) is executed at the task T0.

The software button 42 is used by combining with the software button 43 or 44 in designating transition of executing the program.

The software button 43 is a conditioned jump function for making execution of the program transit to a designated step when a designated condition is established.

On the other hand, the software button 44 is an unconditional jump function for making execution transit to an unconditionally designated step.

Designation of the condition is executed by operating the keys of the instruction apparatus 11 by the operator in selecting the software buttons 43, 44.

As shown by FIG. 4, the software button is described not only with a letter but also with a mark in line with meaning thereof, thereby, even other than a skilled operator can easily understand meaning and flow of the program.

Figure 5:
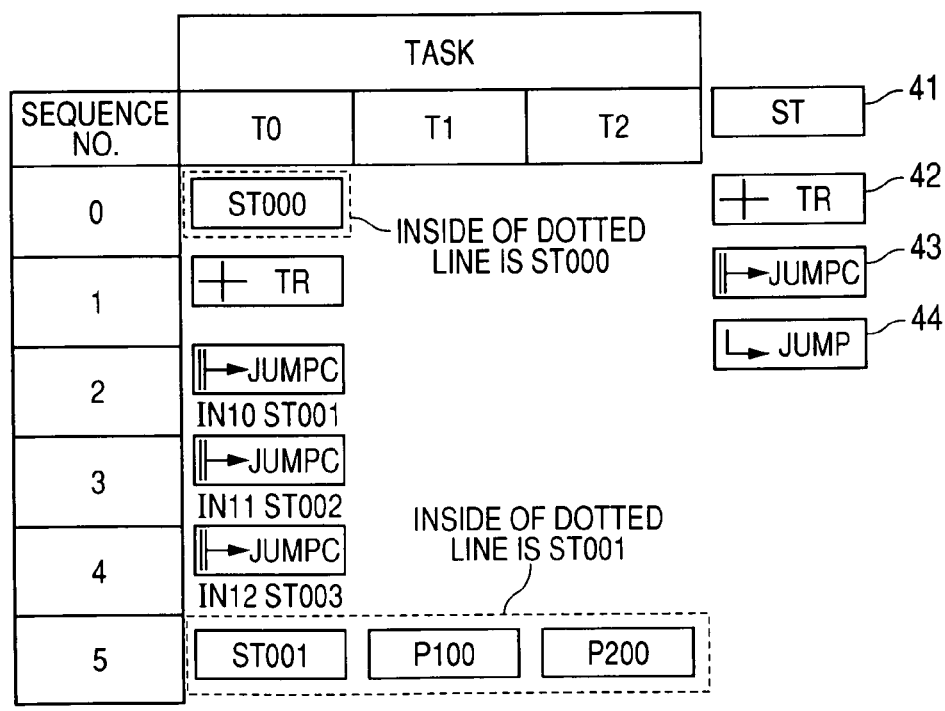
FIG. 5 is a diagram showing an example of the graphic program formed on the screen shown in FIG. 4.
Figure 10:
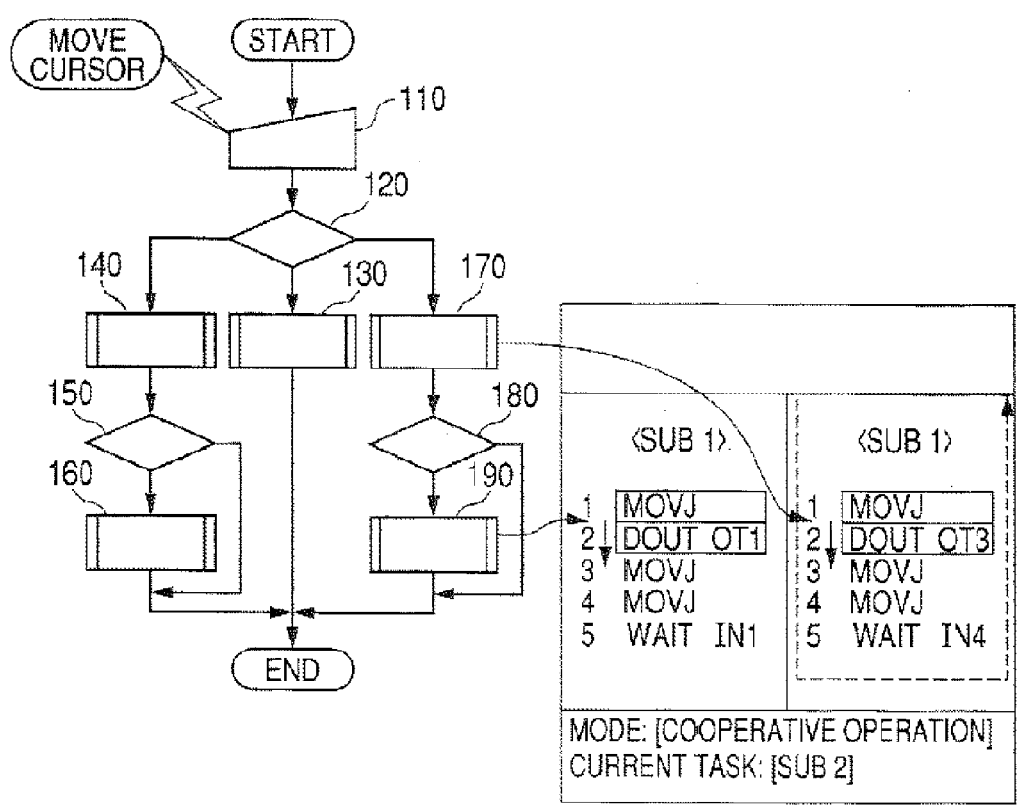
FIG. 10 is a diagram showing a behavior of controlling a display of the background art.

FIG. 5 is an example of a formed graphics program.

An explanation will be given by taking an example of sequence No. 2 of FIG. 5. The sequence No. 2 is conditioned jump, 'IN10 ST001' described therebelow signifies to make the execution transit to step 1 (ST001) when an external signal is inputted to input signal No. 10 at inside of the robot control apparatus 10.

As in a row of sequence No. 5, at ST001, P100 is executed by the task T1, P200 is executed by the task T2. Notations P100, P200 respectively designate a robot program 100, a robot program 200. The robot programs are elements constituting the step, described with the instruction of operating the robot and stored to the storing portion.

Further, also sequence Nos. 3, 4 signify to make execution transit to step 2 (ST002), step 3 (ST003) when an external signal is inputted.

A program converting portion 4 converts the graphic program shown by FIG. 5 formed by the operator into the robot program. Conversion from the graphic program to the robot program can be executed by the operation of the instruction apparatus 11.

FIG. 6 shows an example when portions of sequence Nos. 0 through 4 of the graphic program shown in FIG. 5 are converted into the robot program. As described above, the converted robot program is stored to the storing portion.

At sequence Nos. 0 through 4, only the task T0 is described, as described above, the task T0 is the task for governing other tasks, and therefore, an instruction of operating the robot is not included in FIG. 6.

Successively, an explanation will be given of execution (play back) of the robot program formed as described above.

When the operator selects a desired one from the robot programs stored to the storing portion by operating the keys of the instruction apparatus 11, the program converting portion 4 converts the robot program into the graphic program conversely to preceding step to display on the display screen 12.

Further, the operator can play back the selected robot program by operating the keys of the instruction apparatus 11. Specifically, the program execution portion 5 at inside of the robot control apparatus 10 interprets the robot program as shown by FIG. 6 and outputs an instruction to the servo control portion 6, and the respective robots execute operation.

In the example of FIG. 5, when jumped to step 1 (ST001), at the task T1, the robot program 100 (P100) is executed, at the task T2, the robot program 200 (P200) is executed, when the unit combined with the robots R1 and R2 is allocated to the task T1, a unit combined with the robots R3 and R4 is allocated to the task T2, in the robot program 100 (P100), cooperative operation of 2 pieces of the robots R1, R2 is executed, in the robot program 200 (P200), cooperative operation of 2 pieces of the robots R3, R4 is executed. At this occasion, the two robot programs are executed in parallel.

Further, in play back time, such that the operator is easy to optically recognize the display, when the display screen 12 is a monochromatic display, only a portion of being executed at inside of the program region 40 is invertedly displayed, when the display screen 12 corresponds to multicolor display, only a portion of being executed at inside of the program region 40 is changed in color thereof, thereby, a currently executing portion in the program is displayed.

As described above, according to the robot system of the invention, there is achieved a significant effect of capable of easily forming operation sequences of a plurality of robots without being accustomed to a special language, further, by graphically displaying the execution state in executing the operation of the robot, the operator can comprehensively determine a current operation situation, and therefore, the robot system of the invention is widely applicable so far as the robot system is a robot system for controlling a plurality of pieces of robots.

Although the invention is explained in details and in reference to specific embodiments, it is apparent for the skilled person that the invention can variously be changed or modified without deviating from the spirit and the range of the invention.

The application is based on Japanese Patent Application, Japanese Patent Application No. 2004-319169 filed on Nov. 2, 2004, and a content thereof is incorporated herein by reference.

The invention claimed is:

1. A robot control apparatus for controlling one or more of a plurality of pieces of robots simultaneously based on a robot program, comprising:
   a unit registration portion where multiple units are registered by an operator, with each of said units being a combination of one or more of the plurality of pieces of robots,
   a task registration portion where multiple tasks are registered by the operator, with each of said tasks being assigned to each of the units, and
   a graphics language processing portion for forming the robot program as a graphical program for each of the tasks, wherein:
the graphical program is displayed as a two-dimensional matrix on a display member of a robot instruction apparatus connected to the robot control apparatus,
sequence numbers and the multiple tasks are displayed on the matrix in a perpendicular direction to each other,
a robot in the unit assigned to one of the tasks operates in accordance with a program assigned to the one task,
the program assigned to the one task is displayed in the matrix at the intersection of one of the sequence numbers and the one task,
the operator performs registration by operating the robot instruction apparatus, and
the program assigned to the one task is selected from a plurality of programs assignable to the one task, each of the plurality of programs including a distinct set of instructions corresponding to distinct combinations of the plurality of pieces of robots.

2. The robot control apparatus according to claim 1, wherein
the graphics language processing portion displays the sequence numbers at each row of the display member of the robot instruction apparatus, and displays the robot program executed at each of the tasks in a column.

3. The robot control apparatus according to claim 2, wherein
the graphics language processing portion makes execution transit to a next step after finishing to execute a current step.

4. The robot control apparatus according to claim 2, wherein
the graphics language processing portion makes the execution transit to a predetermined step based on an external input signal to the robot control apparatus after finishing to execute the current step.

5. A robot system comprising:
a plurality of pieces of robots,
a robot control apparatus according to claim 1 for simultaneously controlling one or more of the plurality of pieces of robots based on a robot program, and
the robot instruction apparatus connected to the robot control apparatus and including the display member and an edit member of the robot program.

6. The robot control apparatus according to claim 1, wherein the multiple units are registered on the display member of the robot instruction apparatus.

* * * * *